(12) United States Patent
Berkner et al.

(10) Patent No.: US 11,970,222 B2
(45) Date of Patent: Apr. 30, 2024

(54) END STOP RETURN FUNCTION FOR VEHICLE STEERING

(71) Applicant: Volkswagen Aktiengesellschaft, Wolfsburg (DE)

(72) Inventors: Stefan Berkner, Gifhorn (DE); Jens Zientek, Sommersdorf (DE); Barbara Neef, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/355,619

(22) Filed: Jun. 23, 2021

(65) Prior Publication Data

US 2022/0001919 A1    Jan. 6, 2022

(30) Foreign Application Priority Data

Jul. 1, 2020    (DE) .................... 10 2020 208 261.8

(51) Int. Cl.
*B62D 5/04*    (2006.01)
*B62D 6/00*    (2006.01)

(52) U.S. Cl.
CPC ......... *B62D 5/0469* (2013.01); *B62D 5/0466* (2013.01); *B62D 6/008* (2013.01)

(58) Field of Classification Search
CPC .... B62D 5/0469; B62D 5/0466; B62D 6/008; B62D 6/00; B62D 5/0424; B62D 5/0463
USPC ........................................................ 180/446
See application file for complete search history.

(56) References Cited

U.S. PATENT DOCUMENTS

| | | | |
|---|---|---|---|
| 9,796,413 B2 | 10/2017 | Kitazume | |
| 10,214,234 B2 | 2/2019 | Kim | |
| 10,308,282 B2 | 6/2019 | Katzourakis et al. | |
| 11,312,411 B2 | 4/2022 | Mueller | |
| 2018/0281851 A1* | 10/2018 | Maeda ................ | B62D 5/0493 |

(Continued)

FOREIGN PATENT DOCUMENTS

| | | | |
|---|---|---|---|
| CN | 106945715 A | 7/2017 | ............... B62D 5/00 |
| CN | 111344547 A | 6/2020 | ............... B62D 5/04 |

(Continued)

OTHER PUBLICATIONS

Chinese Office Action, Application No. 202110744478.5, 7 pages, dated Dec. 6, 2023.

*Primary Examiner* — Scott A Reinbold
(74) *Attorney, Agent, or Firm* — Slayden Grubert Beard PLLC

(57) ABSTRACT

A method for actuating a vehicle steering actuator which is coupled to a steering gear, comprising: providing an end stop return function with which a first control variable for the vehicle steering actuator can be ascertained, on the basis of which a force that returns the steering gear in the direction of a defined position can be at least partially generated with the vehicle steering actuator; ascertaining whether the steering gear falls below a limit distance from an end stop; and if this is the case: actuating the vehicle steering actuator on the basis of the first control variable ascertained with the end stop return function, which control variable has a value above a threshold value; wherein, if the limit distance is not fallen below, no control variable is ascertained with the end stop return function or a control variable with a value not exceeding the threshold value.

7 Claims, 2 Drawing Sheets

(56) References Cited

U.S. PATENT DOCUMENTS

2019/0270482 A1* 9/2019 Nakakuki ............ B62D 5/0469
2019/0344823 A1   11/2019 Miyajima

FOREIGN PATENT DOCUMENTS

| DE | 102009006211 A1 | 7/2010 | ............... B62D 6/00 |
| EP | 0842840 B1 | 5/1998 | ............... B62D 5/04 |
| FR | 2887842 B1 | 1/2007 | ............... B62D 6/00 |
| JP | 3047598 B2 | 5/2000 | ............... B62D 5/04 |
| JP | 2000149188 A | 5/2000 | ............ B60K 31/00 |

* cited by examiner

END STOP RETURN FUNCTION FOR VEHICLE STEERING

CROSS-REFERENCE TO RELATED APPLICATIONS

This application claims priority to German Patent Application DE 10 2020 208 261.8, filed on Jul. 1, 2020 with the German Patent and Trademark Office. The contents of the aforesaid Patent Application are incorporated herein for all purposes.

TECHNICAL FIELD

The invention relates to a method and a control unit for actuating a vehicle steering actuator by means of an end stop return function. In general, the invention relates to the field of vehicle technology and, more particularly, motor vehicle technology.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Steering systems generate steering forces through actuators with what are known as return functions. These are generally tasked with returning a steering gear to a predetermined position. This position typically corresponds to driving in a straight line. Such return functions are typically provided in a control unit of a vehicle steering system and continuously ascertain control variables for a vehicle steering actuator (for example an electric motor or generally servo motor). The vehicle steering actuator may also obtain control variables from other functions and determine a force that it must apply from the total obtained control variables. The functions that transmit control variables to the vehicle steering actuator are typically optimized for their respective tasks (for example, generating return forces), for example with regard to safety limits that must be adhered to, a steering feel perceptible by the driver, or the interactions with other functions.

Vehicle steering systems and for example steering gears have what are known as end stops. This can be a mechanical end stop that limits a maximum displacement or, in other words, a maximum steering angle of the steering in both directions (steering to the left and steering to the right). However, software end stops also exist. These typically define a movement limit of the steering gear and for example any rack or other displaceable gear members which, when said limit is exceeded, forces autonomous of the driver are generated which make further displacing in the direction of the mechanical end stop difficult.

For example, software end stops exist as functions of a control unit that output control variables to the vehicle steering actuator at a certain distance before the mechanical end stop. Based on this, the vehicle steering actuator can generate forces that act against a force applied by the driver, i.e., prevent further displacement in the direction of the mechanical end stop.

Near a (mechanical or software) end stop of the steering, it is also desired to provide the described return function, for example to ensure a familiar steering feel for the driver. However, it has been shown that increased forces acting on the steering occur especially near the end stop in specific axle and/or steering configurations. These cannot be readily overcome by conventional return functions for generating a return action. In other words, with certain steering and/or axle configurations, it is possible that for example at low driving speeds and large steering angles (i.e., for example during maneuvering or parking processes), conventional return functions no longer develop a sufficient return action. In these operating states, the driver may feel that the steering is unnatural and stiff.

In principle, there is the possibility of identifying such operating states and there (i.e., in the region of a mechanical and/or software end stop of the steering) generating increased return forces limited to the region of the end stop with a conventional return function.

Some solutions have in common that a return function used even remote from the end stop is changed so to speak locally in the region of the end stop in order to react to specifics given there. This requires, however, comprehensive adaptations to the specifics of a concrete steering gear in the region of its end stop. In addition to the accompanying development effort, the transferability to other steering systems or steering gears is also impeded in certain circumstances as a result.

Furthermore, it is not trivial to specially adapt a return function used over the entire steering range in the region of an end stop when interactions with other steering functions must be taken into account. Non-linearities must also be considered, since the driver usually applies maximum manual torques both at the end stop and when steering out of a neutral position. This means that there is no linear increase or decrease of the manual torque over the range of movement of the steering gear. This also makes it difficult to suitably set a return function for the entire range of movement of a steering gear.

Another solution is to adapt the previously mentioned software end stop. For the described steering systems that make a return in the end stop region difficult, this can be adapted such that its forces acting against the driver are higher and thus act as a return and/or are generated closer to the region of the actual mechanical end stop. However, it has also been shown here that this is not readily possible when taking into account a steering feel to be maintained as well as in the case of non-linearities and interactions with other functions.

SUMMARY

There is therefore a need to improve the actuation of for example a vehicle steering actuator also in the region of the end stops of a vehicle steering system with regard to a steering feel that occurs and/or a return action of the steering.

The need is addressed by the subject matter of the attached independent claims. Embodiments of the invention are described in the dependent claims, the following description, and the drawings.

DESCRIPTION

Figure 1:
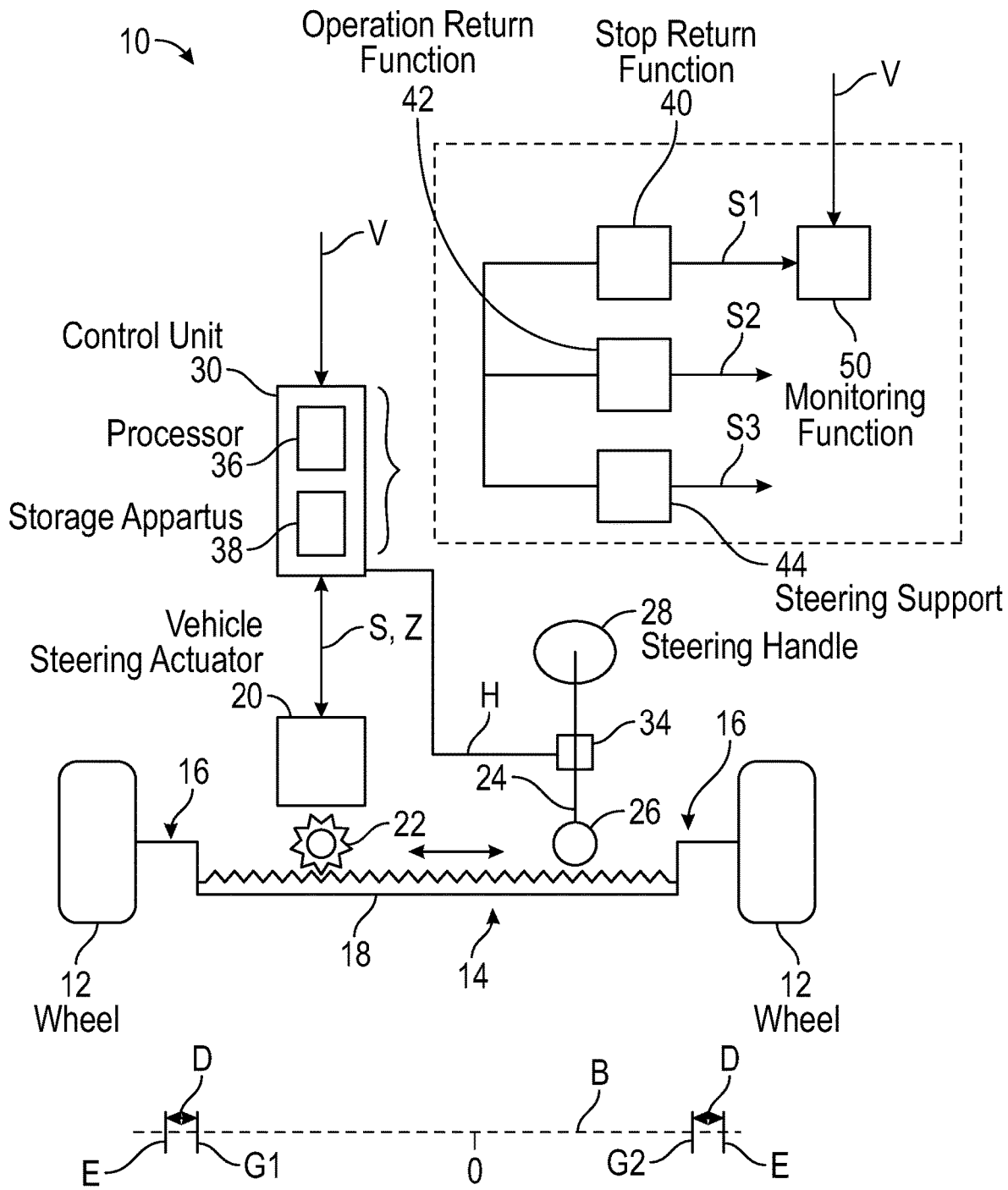
FIG. 1 shows a schematic representation of a vehicle steering system with a control unit according to an exemplary embodiment that executes a method according to an exemplary embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In general, some exemplary embodiments provide an additional return function to compensate for excessive forces acting on the steering that occur in the region of the end stop and act against a return. These forces acting on the steering can be, for example, transferred from the wheels to the steering gear. This compensation return function will be referred to in the following as an end stop return function. This is based on the idea that this return function is limited significantly to the end stop region, i.e., is for example only used there. For example, this end stop return function is provided in addition to an already provided return function for normal operation (in the following normal operation return function). In other words, the end stop return function is added especially for generating a desired return action in the end stop region. The normal operation return function can, in contrast, be operated in parallel with the end stop return function in the usual manner over the entire steering range and, e.g., therefore also in the end stop region.

This enables the normal operation return function to be less comprehensively adapted to a steering system that, in deviation from conventional steering types, possesses, for example, no self-aligning action in the end stop region. For example, normal operation return functions of existing conventional steering gears may therefore be used with limited adaptations, and to compensate for the lack of self-aligning action of a special steering gear, the end stop return function may additionally be provided. This reduces, e.g., the development effort and for example the adaptation effort of the normal operation return function.

Furthermore and in some embodiments, this enables the normal operation return function to be optimized for operating states that occur more often during driving operation. The end stop return function, however, is only optimized for the special operating state, occurring rather seldom during vehicle operation, of steering near the end stops and in some embodiments also at only low driving speeds. Therefore, a defined division of duties of the return functions may be provided. In some embodiments, this improves the ability of the individual functions to be tailored to the respectively provided use scenarios and/or operating states and leads in some embodiments to an unbundling of these functions or respectively of the different requirements with regard to the return actions to be provided in the region of an end stop as well as outside of it. Furthermore, this may enable an improved handling of non-linearities of the previously described type. Furthermore, this may improve the safety, since the different return functions can then be monitored separately and with regard to the conditions or operating limits they must each adhere to.

According to a first exemplary aspect, a method is proposed for actuating a vehicle steering actuator (e.g., of an electric motor and for example of a servo motor) which is coupled to a steering gear (for example which is in engagement therewith via a pinion driven by the actuator or a lever), which method comprises:

providing an end stop return function with which a first control variable for the vehicle steering actuator can be determined, on the basis of which a force can be generated at least partially and with the vehicle steering actuator, which force moves the steering gear in the direction of a defined position;

determining whether the steering gear (for example an optional rack thereof or another movable gear member) exceeds a limit distance from a (for example mechanical) end stop;

and if this is the case:

actuating the vehicle steering actuator on the basis of the first control variable which has a value above a threshold value;

wherein, when the limit distance is not fallen below, no control variable (for example not the first) is determined with the end stop return function, on the basis of which a force may be generated with the vehicle steering actuator that returns the steering gear to a defined position, or only one control variable with a value not exceeding the threshold value.

In other words, a control variable for generating a return action may only be generated and output selectively with the end stop return function when the limit distance is fallen below. Outside of the limit distance, or respectively if this is not fallen below, no such determination and/or output of a control variable takes place. However, as before, a control variable with the value of zero can be output or with a value below a threshold value, wherein a return action may only be achieved once the threshold has been exceeded in some embodiments.

The end stop return function is not limited to working directly on the end stop. Instead and in some embodiments, it may generate return forces above the threshold value in a defined angular range between the end stop and limit distance. Alternatively and in some embodiments, purely a return function or compensation return function could also be discussed or a first return function in comparison with a second (normal operation) return function.

The steering gear may in some embodiments comprise a rack. The invention, however, is not limited to a specific type of steering gear. For example, it may also be used in steering gears without a rack and for example in steering gears with a ball screw.

In principle and in some embodiments, it may be provided that the end stop return function is only selectively activated and/or engaged when the limit distance is fallen below. However and in some embodiments, the end stop return function is continuously activated but generates a first control variable, with which a return action can be achieved, only when the limit distance is fallen below, and for example only when the limit distance of a control variable with a value different than zero is fallen below. In other words, outside of the limit distance, a control variable output by the end stop return function cannot cause the vehicle steering actuator to generate forces and/or at least not such forces with which the steering gear may be moved or with which the steering gear can be moved in the region of the end stop.

All functions and for example return functions described herein may be realized as software components of a control unit of the vehicle steering system. This may obtain or determine movement variables of the steering system and for example of the steering gear. In the first case, the movement variables may be detected using sensors. To ascertain them, these movement variables may be inferred indirectly, e.g., using an angular position and/or a rotational speed of the vehicle steering actuator, if a transmission ratio between the actuator and the steering gear (for example an optional rack thereof) is known.

Control variables generated with a return function may be output by the control unit to the actuator and for example to a control apparatus thereof. For example, in accordance with the control variables, electrical power supplies of the vehicle steering actuator may be adapted by its control apparatus in order to generate forces according to the present control variables and, e.g., to move the steering gear as a result.

In order to generate a force with the vehicle steering actuator on the basis of the control variable, with which force the steering gear may be returned to a defined position even when the limit distance is fallen below (i.e., in the end stop region), the control variable for example lies above a threshold value. This may be ascertained experimentally, with a simulation, and/or with a calculation. It may be established such that the control variable actuates the vehicle steering actuator to generate forces that compensate for or exceed the forces acting on the steering and exerted on the steering gear, for example, by the vehicle wheels. However, it is not absolutely necessary for a return action to be achievable in the end stop region only with the first control variable. Instead, on the basis of this control variable, only a portion of a force may be generated in order to generate the return force, for example, together with the mentioned normal operation return function as well as a control variable ascertained therefrom.

In some embodiments, it is provided that as an additional condition for actuating the vehicle steering actuator on the basis of the end stop return function (or respectively on the basis of the first control variable ascertained therefrom) it is ascertained whether an operating state-dependent criterion of a vehicle comprising the steering gear is met. For example, this criterion may be met when a vehicle speed lies below a predetermined limit value. The criterion may therefore refer to a driving state as the operating state. The vehicle steering actuator may only be actuated by the end stop return function, or its ascertained first control variable, if the vehicle speed is correspondingly low in some embodiments. To be more precise, a first control variable that, in the manner described, has a value above the threshold value may then only be ascertained with the end stop return function. Above the limit value of the vehicle speed, no control variable may then in turn be ascertained with the end stop return function, or only a control variable with a value not exceeding the threshold value.

These embodiments put the use scenario of the end stop return function into more concrete terms and limits it to a scope in which a conventional normal operation return function is not expected to generate sufficient return forces. One insight of the teachings herein consists in that the lack of self-steering action of a steering gear in special designs primarily occurs when the steering system is located in the end stop region but at the same time low driving speeds are present. With the end stop return function, which is only used at correspondingly low driving speeds, it may therefore be ensured that additional return forces may be generated in a particularly need-based manner in some embodiments.

A further operating state-dependent criterion that may additionally or alternatively be provided in some embodiments relates to activating assistance functions. For example with assistance functions that are at least partially autonomous of the driver and more particularly with those that at least partially autonomously control (driving) operation of the vehicle, the requirements of the exact setting of a desired steering feel may be lower. Accordingly, when these assistance functions at least partially control the operation and for example the steering of the vehicle, generating significant forces with the end stop return function may be dispensed with. An example of such an assistance function, which is discussed in the following, is a parking function.

In some embodiments a (for example conventional) normal operation return function is additionally provided. With this, a second control variable for the vehicle steering actuator may be ascertainable regardless of the limit distance being fallen below. By means of this control variable, the vehicle steering actuator may be caused to at least partially generate a force that returns the steering gear to a defined position. When the limit distance from the end stop is exceeded, this force alone may be sufficient to achieve the return action. While the limit distance is fallen below, such a force may be generated that, in sum with a force generated according to the first control variable of the end stop return function, together develops a sufficient return action.

Accordingly, it is provided in some embodiments that the vehicle steering actuator is actuated both on the basis of the first and the second control variable when the limit distance is fallen below. In general, operation of the normal operation return function is also therefore maintained in the end stop region (i.e., when the limit distance is fallen below). The end stop return function generates, by contrast, additional return forces for example only selectively in the end stop region in order to take account of the specifics of a specific vehicle steering system and, e.g., its lack of self-steering in the end stop region.

In this context, it may be provided in some embodiments that the end stop return function and the normal operation return function are each based on characteristic curves. The characteristic curves may deviate from each other. In a manner known per se, the characteristic curves may define values of the respective control variables depending on a movement variable. The movement variable may be a movement variable of the steering gear and, e.g., of an optional rack thereof.

For example, it may be provided that the characteristic curves of the aforementioned return functions have different curves. For example, the end stop return function (even regardless of its relationship to the characteristic curve of the normal operation return function) is non-linear. In some embodiments, it has a progressive and/or exponential curve.

Using characteristic curves enables the need-based provision of return forces. Using different characteristic curves enables the end stop and normal operation return functions to be adapted in a targeted manner to their respective (primary) use scenarios.

In some embodiments, the vehicle steering actuator may also be actuated on the basis of a third control variable that is generated by a steering force support function. In a manner known per se, the steering force support function may serve to exert a force on the steering gear which supports the driver in order to implement steering desired by the driver.

In this context, it is in some embodiments provided that, on the basis of the third control variable, a first maximum force may be generated (for example for normal operation outside of an end stop region).

Additionally or alternatively and in some embodiments, a second maximum force may also be generable on the basis of the third control variable when the limit distance is fallen below and for (manually) oversteering the end stop return function. This may therefore be limited to the end stop region. In some embodiments, this second maximum force corresponds at least to the sum of (for example the quantities or magnitude) of the first maximum force and a return force generated on the basis of the first control variable. This ensures a reliable oversteerability of the forces in the end stop region generated autonomously of the driver. In some embodiments, this is aimed at the scenario in which the driver first steers in a maximally returning manner in the end stop region and a maximum return force is also generated thereby by the end stop return function. However, if the driver would then like to spontaneously counter steer, he should be able to steer to overcome the steering forces active up to that point and generated autonomously of the driver. This is ensured by the embodiments above, which improve driving safety and generally the controllability of the steering system from the driver's perspective.

In some embodiments, a monitoring function is provided with which the first control variable may be verified with regard to at least one criterion. The monitoring function may in turn be provided as the function of a control unit, i.e., for example be generally executed in a computer-based and/or computer-supported manner. The monitoring function is for example configured to prevent the vehicle steering actuator from being actuated on the basis of the first control variable when the criterion is violated (i.e. not met). In some embodiments, the monitoring criterion may therefore ensure that exclusively situationally appropriate values of the first control variable are output and actually used to actuate the vehicle steering actuator. For this purpose, it may perform, for example, a type of plausibility check or ensure that safety limits are adhered to.

In some embodiments, it may be provided that the criterion verified by the monitoring function defines permissible values of the control variable depending on a movement variable of the steering gear (for example of any rack thereof or another movable gear member). For example, the monitoring function may specify that the control variable can only have a value above the mentioned threshold value after a minimum movement of the steering gear from its neutral position (e.g., when at least 50% of the maximum path between the neutral position and an end stop has been traveled). Then, the value of the control variable permissible from the perspective of the monitoring function may rise as the displacement path of the steering gear increases. For example, it may increase linearly toward a maximum value. The latter may correspond with a value of the control variable with which a force of, for example, up to 4 kN may be generated by the vehicle steering actuator. By using the mentioned monitoring function and in some embodiments, an additional safety level is provided to ensure that the steering forces generated autonomously of the driver by means of the end stop return function are actually appropriate for a current operating state.

In some embodiments, the previously discussed operating state-dependent criterion relates to a parking function. To be more precise, when a parking function (or also a reverse parking function) that is autonomous of the driver is activated, the actuation of the vehicle steering actuator on the basis of the (or by the) end stop return function may be at least temporarily deactivated and/or the operating state-dependent criterion may be unmet. This is based on the idea that the parking function that is autonomous of the driver should not have to overcome any forces generated by the end stop return function. It is therefore irrelevant, in the context of the parking function which is autonomous of the driver, which steering feel occurs, for example in the case of what is known as a hands-off parking assistant in which the driver does not actuate the steering handle. In contrast, when the parking function which is autonomous of the driver is interrupted, for example because the driver grips the steering handle, the end stop return function may be selectively engaged again. This enables a need-based use of the end stop return function and a simplified design of the parking function which is autonomous of the driver, for example over a plurality of different vehicle types, without them having to be adapted to end stop return functions that are provided only for specific vehicle or steering variants.

A second exemplary aspect relates to a control unit (also referred to as 'control circuit' herein) for actuating a vehicle steering actuator which is coupled to a steering gear, wherein the (generally digital and/or electronically operable) control unit comprises an end stop return function with which at least one first control variable for the vehicle steering actuator can be determined, on the basis of which a force that returns the steering gear in the direction of a defined position can be generated with the vehicle steering actuator, wherein the control unit is configured to determine whether the steering gear falls below a limit distance from an end stop; and if this is the case, to activate the vehicle steering actuator on the basis of the first control variable determined with the end stop return function which has a value above a threshold value; wherein the control unit is also configured to determine no control variable with the end stop return function or a control variable with a value that does not exceed the threshold value when the limit distance is not fallen below.

The control unit may comprise at least one processor and/or at least one storage apparatus. Program instructions may be saved on the storage apparatus and, when executed by the processor, may cause the control unit to perform any function and/or measure described herein. In general, the control unit can execute a method according to any of the embodiments described herein. For this purpose, the control unit may have all further features and functions in order to provide such a method. For example, all embodiments and developments of method features may also apply to the identical features of the control unit or be provided therein.

In general, it is understood that the vehicle can have two end stops, or respectively end stop regions, for both steering directions. The teachings herein can be used and function in both end stops, or respectively end stop regions, in the same way.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic vehicle steering system 10. This is front-axle steering in a passenger vehicle. Two front wheels 12 are indicated which can be displaced by a steering gear 14. For this purpose, the wheels 12 are connected to a rack 18 of the steering gear 14 via connection members 16 (not shown in more detail). The rack 18 can be, as indicated by a double-headed arrow, displaced linearly. This linear displacement can be converted into a rotational movement of the wheels 12 about an axis, which is vertical in FIG. 1, via the connection members 16 in a manner known per se.

The steering system 10 also comprises a vehicle steering actuator 20. This is designed in the form of an electric motor. The vehicle steering actuator 20 drives a pinion 22 which is in an engagement with the rack 18. A steering shaft 24 is also in engagement with the rack 18 (for example via a schematically indicated worm wheel 26). The steering shaft 24 is connected to a steering handle 28 (a steering wheel) and can therefore be actuated manually. Via the steering handle 28 and the vehicle steering actuator 20, torques can thus be generated which act as forces on the rack 18 and, to be more precise, as displacement forces according to the double-headed arrow shown. In the following, the exemplary steering system 10 depicted is an electromechanical steering system.

A control unit 30 is also shown. This outputs control signals S to the vehicle steering actuator 20 and receives state parameters Z from it. Movement variables of the steering gear 14 and for example the rack 18 can be ascertained from the state parameters in a known manner. For example, from an angular position of the pinion 22 or of an output shaft of the vehicle steering actuator 20, respectively, a rack position along the linear movement path of the pinion or the linear movement axis B of the shaft, respectively, can be inferred.

A movement axis B of the rack 18 is indicated in FIG. 1. The rack 18 can be displaced linearly along this axis. A neutral position zero is shown. If a center point of the rack 18 covers the neutral position zero, the steering gear 14 is not displaced, i.e., driving in a straight line is taking place. End stops E are also shown. The left and right end regions or outer regions of the rack 18 in FIG. 1 can be displaced up to these end stops E, which are realized by mechanical elements (not shown) near the respective connection members 16. A further displacement via the end stops E in a direction leading away from the neutral position zero is mechanically/structurally prevented.

Movement limits G1, G2 established based on software are also shown. If these are reached by the respective end regions of the rack 18, a limit distance D of the rack 18 from the end stops E is fallen below. Whether these limits G1, G2 are reached can in turn be ascertained by the control unit 30 using a rack position that is acquired from the state parameters Z.

The control unit 30 is also connected to a manual torque sensor 34. Through this, the control unit 30 obtains information about a currently applied manual torque H.

A processor 36 and a storage apparatus 38 are also shown as components of the control unit. Program instructions that are executed by the processor 36 are saved on the storage apparatus 38. By this means, the steering functions 40-44 shown schematically and enlarged in a dashed-line frame are executed. In this case, it is an end stop return function 40 (explained below) which outputs a first control variable S1. Furthermore, a normal operation return function 42 is provided which outputs a second control variable S2. A steering support function 44 which outputs a third control variable S3 also exists.

In the example shown, it is provided that all of the steering functions 40-44 are operated in parallel, i.e., also output their control variables S1-S3 continuously or simultaneously. These are then added to the control variable output in total to the vehicle steering actuator 20, or respectively the control signal S. The control variable S causes the vehicle steering actuator 20 to apply a force to the rack 18 via a rotation of the pinion 22 so that the rack is displaced along the movement axis B in a desired manner. For example, the control variables S1-S3 or at least the control variable S can therefore be rack target forces which are to be applied by the vehicle steering actuator 20. Alternatively, electrical variables representing such a rack target force could also be provided as control variable S or respectively control variables S1-S3, wherein these electrical variables are, for example, operating variables of a power supply (e.g. of a power converter) of the vehicle steering actuator 20 with which a desired rack target force can be set.

The control variable S, or respectively the control variables S1-S3, are therefore each distinguished by a value. This may, e.g., also be signed in order to specify whether the rack 18 in FIG. 1 should be moved to the left or to the right, i.e., in which direction steering should occur. The return functions 40, 42 specify in general control variables S1, S2, or respectively forces, that displace the rack 18, or respectively its center point, in the direction of the neutral position 0 again. Knowing the current rack position, which is transmitted by the control unit 30 to the functions 40, 42, the signs of the control variables S1, S2, or respectively the forces to be generated therewith, can be established in a suitable manner for this purpose.

In contrast, the steering support function 44 generates a force component that acts in the direction of a rack movement specified by the driver via the steering handle 28. The sign of the corresponding control variable S3, or respectively a force generated on this basis, can be selected according to the obtained manual torque H.

In the example shown, the control unit 30 works as follows: During operation of the steering system 10, as soon as a displacement from the neutral position 0 of the rack 18 is present, a return force is continuously ascertained with the normal operation return function 42 and output via the control variable S2. As a force component, this return force S2 partially determines the forces applied to the rack 18 by the vehicle steering actuator 20 and therefore also determines the steering feel perceptible by the driver on the steering handle 28 coupled to the rack 18. If the driver additionally applies a manual torque H, the steering support function 44 generates the control variable S3, with which a force component acting in the direction the driver wishes can be generated by the vehicle steering actuator 20.

If the rack 18 now enters into an end stop region by exceeding the limits G1, G2 (i.e. falling below the limit distance D from one of the end stops E), the first control variable S1 is ascertained and output with the end stop return function 40 such that an additional return force component (in addition to the normal operation return function 42) can be generated. The end stop return function 40 is for example also in operation before reaching the limits G1, G2 but outputs until then a control variable S1 with the value of zero, or respectively a control variable S1 that generates a force component with the value of zero. Whether the limit G1, G2 was exceeded can in turn be ascertained by the control unit 30 and/or the end stop return function 40.

It is not shown separately that any of the steering functions 40-44 can work based on characteristic curves. Depending on a current movement variable of the steering gear 14, wherein it can be for example a rack position 18, the respective values of the control variables S1-S3 can be established using these characteristic curves. In the case of the end stop return function 40, this characteristic variable for example defines a value of zero until the limits G1, G2 are reached. It can then progressively and/or exponentially rise.

An optional monitoring function 50 is also indicated. This can obtain the value of the control variable S1 from the end stop return function 40 and verify it with regard to predetermined criteria explained in the general part of the description. Only when these criteria are met can the control variable S1 be output to the vehicle steering actuator 20 as a component (e.g. as a summand) of the control variable S.

Some embodiments provide that at least one of the control unit 30 and monitoring function 50 also obtains information regarding a current driving speed V. These can be obtained, for example, via typical speed sensors of the vehicle (not shown) or in general via a communication bus of the vehicle (also not shown). Only when the speed V lies below a threshold value of, for example, less than 10 km/h or less than 5 km/h can the control variable S1 be evaluated as reliable by the monitoring function 50. In other words, the non-exceeding of a corresponding limit speed can be a criterion verified by the monitoring function 50. Alternatively or additionally, the control unit 30 or the end stop return function itself can verify whether the limit speed is adhered to. If this is not the case, no first control variable S1 can be output, or the value of the control variable S1 can be set to zero. Consequently, it is also possible that the end stop return function 40 comprises a characteristic map in which, in addition to the movement variable/control variable characteristic curve explained above, the speed V is included as an additional axis, or respectively as an additional parameter.

The described exemplary embodiments ensure that a sufficient return action can be achieved even in the case of steering systems that may not be completely self-steering in the end stop region. For this purpose, the normal operation return function 42 does not have to be specially adapted. For example, a characteristic curve of this normal operation return function can maintain continuous even if the limits G1, G2 are exceeded. It does not have to rise rapidly to compensate for a lack of self-steering action of the steering system 10. Instead, such an additional compensation force quantity can be provided by the end stop return function 40. This enables a functional division between the return functions 40, 42, which can be separately optimized for their respective operating scenarios.

Figure 2:
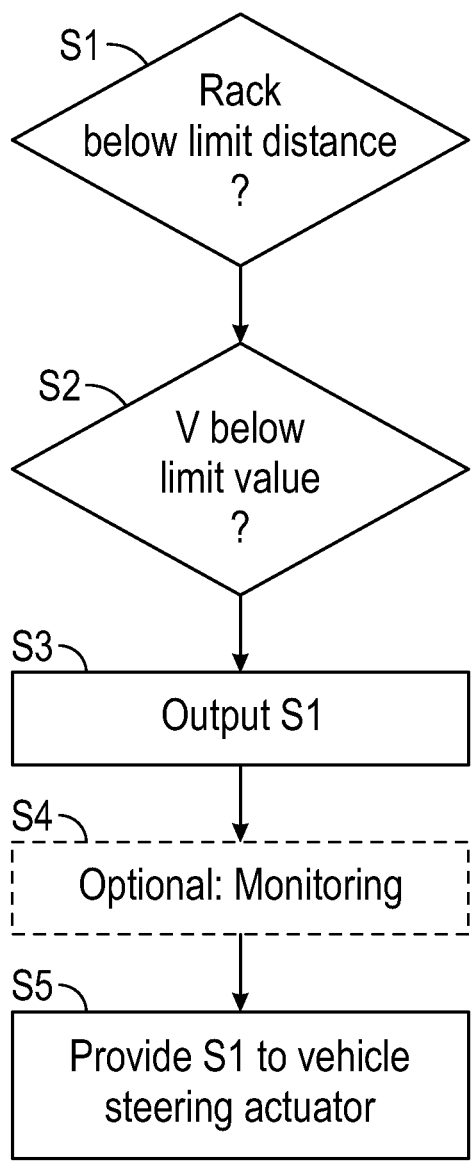
FIG. 2 shows a flow chart of the method from FIG. 1.

An exemplary flow chart of the method described above is shown in FIG. 2. In a step S1, it is ascertained that the rack 18 falls below the limit distance D from one of the end stops E, i.e. is located in the end stop region or is approaching a mechanical end stop. In a step S2, which can also be executed before step S1 or simultaneously with it, it is ascertained that the vehicle currently has a driving speed V below a predetermined limit value. In a step S3, the end stop return function 40 subsequently outputs a control variable S1. This can be verified for its reliability by the monitoring function 50 in an optional step S4. In a step S5, the control variable S1 is output to the vehicle steering actuator 20, being added to any other control variables and for example the control variables S2 and S3. Based on this, the vehicle steering actuator drives the pinion 22 and therefore, in step S5, shifts the rack 18 along the movement axis B according to the control variable S. As soon as this leads to the limit distance D being adhered to again, the end stop return function 40 does not generate a control variable S1 with which a displacement of the rack 18 is possible. Any return forces affecting the steering feel are then, however, generated as before by the normal operation return function 42.

LIST OF REFERENCE NUMERALS

10 Steering system
12 Front wheel
14 Steering gear
16 Connection member
18 Rack
20 Vehicle steering actuator
22 Pinion
24 Steering shaft
26 Worn wheel
28 Steering handle
30 Control unit
32 Manual torque sensor
34 Processor apparatus
36 Storage apparatus
38 End stop return function
40 Normal operation return function
42 Steering support function
44 Monitoring function
S1-S3 First through third control variables
S (Cumulative) control variable/control signal
Z State parameters
H Manual torque
D Limit distance
G1, G2 Limit
E End stop
B Movement axis
0 Neutral position/zero position The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfill the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for actuating a vehicle steering actuator coupled to a steering gear, the method comprising:
providing a second control variable of a normal operation return function to the vehicle steering actuator, wherein the second control variable causes the vehicle steering actuator to generate a normal operation force that returns the steering gear to a defined position independent of a limit distance from an end stop;
determining whether the steering gear is below the limit distance from the end stop;
determining whether a hands-off autonomous parking function is inactive;

in case the steering gear is below the limit distance and the autonomous parking function is determined to be inactive: providing a first control variable of an end stop return function to the vehicle steering actuator, wherein the first control variable causes the vehicle steering actuator to generate a return force component in the direction of the defined position, which return force component is additional to the normal operation force; and otherwise: operating the normal operation return function so that no additional return force component is generated.

2. The method of claim 1, wherein the end stop return function and the normal operation return function comprise characteristic curves that deviate from each other, wherein the characteristic curves define values of the respective control variables depending on a movement variable.

3. The method of claim 1, wherein the vehicle steering actuator can also be actuated by a steering force support function on the basis of a third control variable, wherein, on the basis of the third control variable, a first maximum force and, when the limit distance is fallen below, a second maximum force can be generated, the magnitude of which corresponds at least to the sum of the first maximum force and a maximum return force that can be generated on the basis of at least the first control variable.

4. The method of claim 1, further comprising: providing a monitoring function, with which the first control variable can be verified with regard to at least one criterion and which is configured to prevent the vehicle steering actuator from being actuated on the basis of the first control variable when the criterion is violated.

5. The method of claim 4, wherein the criterion defines permissible values of the first control variable depending on a movement variable of the steering gear and/or the vehicle speed.

6. A control unit for actuating a vehicle steering actuator which is coupled to a steering gear,
wherein the control unit is configured with a normal operation end stop return function that provides a second control variable to the vehicle steering actuator, wherein the second control variable causes the vehicle steering actuator to generate a normal operation force that returns the steering gear to a defined position independent of a limit distance from an end stop;
wherein the control unit is configured to determine:
whether the steering gear is below the limit distance from the end stop; and
whether a hands-off autonomous parking function is inactive;
wherein the control unit is further configured to:
in case the steering gear is below the limit distance and the autonomous parking function is determined to be inactive, provide a first control variable of an end stop return function to the vehicle steering actuator, wherein the first control variable causes the vehicle steering actuator to generate a return force component in the direction of the defined position, which return force component is additional to the normal operation force; and
otherwise: operate the normal operation return function so that no additional return force component is generated.

7. The method of claim 2, wherein the vehicle steering actuator can also be actuated by a steering force support function on the basis of a third control variable, wherein, on the basis of the third control variable, a first maximum force and, when the limit distance is fallen below, a second maximum force can be generated, the magnitude of which corresponds at least to the sum of the first maximum force and a maximum return force that can be generated on the basis of at least the first control variable.

* * * * *